(12) United States Patent
Chopard et al.

(10) Patent No.: US 11,091,907 B2
(45) Date of Patent: Aug. 17, 2021

(54) ASSEMBLY WITH ENHANCED INSULATION

(71) Applicant: HUTCHINSON, Paris (FR)

(72) Inventors: Fabrice Chopard, Saint Martin d'Heres (FR); Cedric Huillet, Montargis (FR)

(73) Assignee: HUTCHINSON

( * ) Notice: Subject to any disclaimer, the term of this patent is extended or adjusted under 35 U.S.C. 154(b) by 0 days.

(21) Appl. No.: 16/641,362

(22) PCT Filed: Aug. 22, 2018

(86) PCT No.: PCT/FR2018/052093
§ 371 (c)(1),
(2) Date: Feb. 24, 2020

(87) PCT Pub. No.: WO2019/038508
PCT Pub. Date: Feb. 28, 2019

(65) Prior Publication Data
US 2020/0224412 A1    Jul. 16, 2020

(30) Foreign Application Priority Data

Aug. 22, 2017    (FR) ...................................... 1757791

(51) Int. Cl.
*F16L 59/065*    (2006.01)
*E04B 1/80*    (2006.01)

(52) U.S. Cl.
CPC ............ *E04B 1/803* (2013.01); *F16L 59/065* (2013.01); *Y10T 428/231* (2015.01)

(58) Field of Classification Search
None
See application file for complete search history.

(56) References Cited

U.S. PATENT DOCUMENTS

2018/0313613 A1    11/2018    Chopard et al.

FOREIGN PATENT DOCUMENTS

| EP | 1 647 758 A2 | 4/2006 |
| FR | 3 040 211 A1 | 2/2017 |
| JP | 2011190925 A | 9/2011 |

OTHER PUBLICATIONS

International Patent Application No. PCT/FR2018/052093, International Search Report and Written Opinion dated Nov. 19, 2018, 9 pgs. [relevance found in citations and English translation of International Search Report].

*Primary Examiner* — Alexander S Thomas
(74) *Attorney, Agent, or Firm* — Lathrop GPM LLP

(57) ABSTRACT

An assembly comprising at least one first pocket (3) which contains a thermally insulating material (5) and in which a first controlled atmosphere prevails, and at least one second pocket (7) which surrounds the first pocket and in which a second controlled atmosphere prevails.
The first controlled atmosphere is different from the second one and corresponds to a vacuum of 10 Pa or less. The thermally insulating material (5) preferably has open cells with a diameter greater than or equal to 1 micron.

20 Claims, 3 Drawing Sheets

Figure 8:
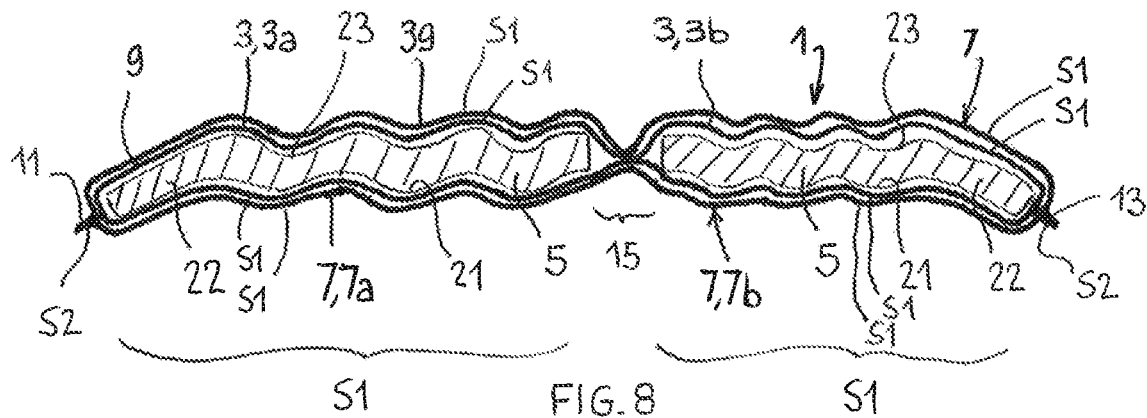

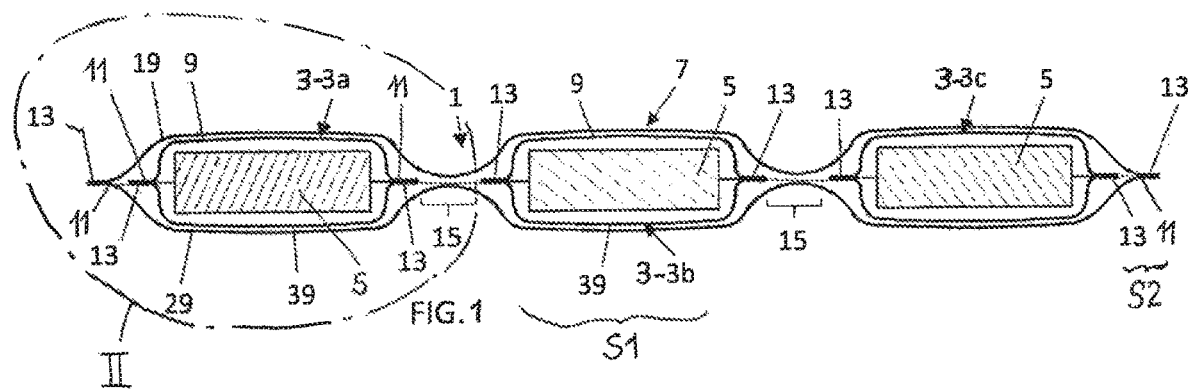
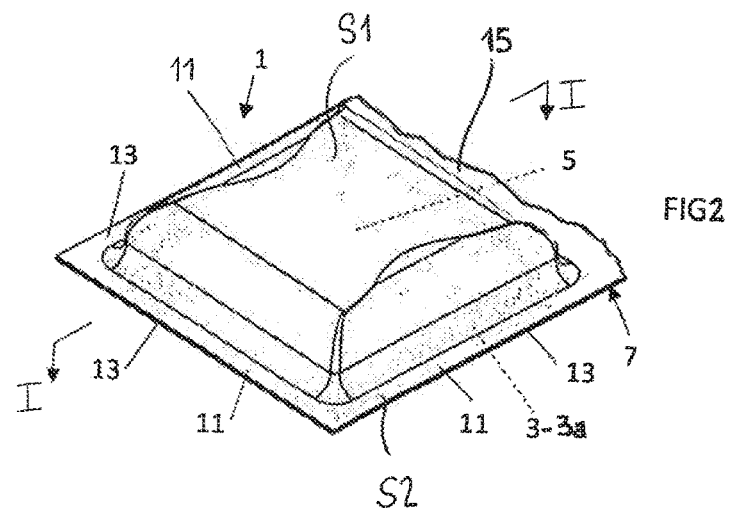

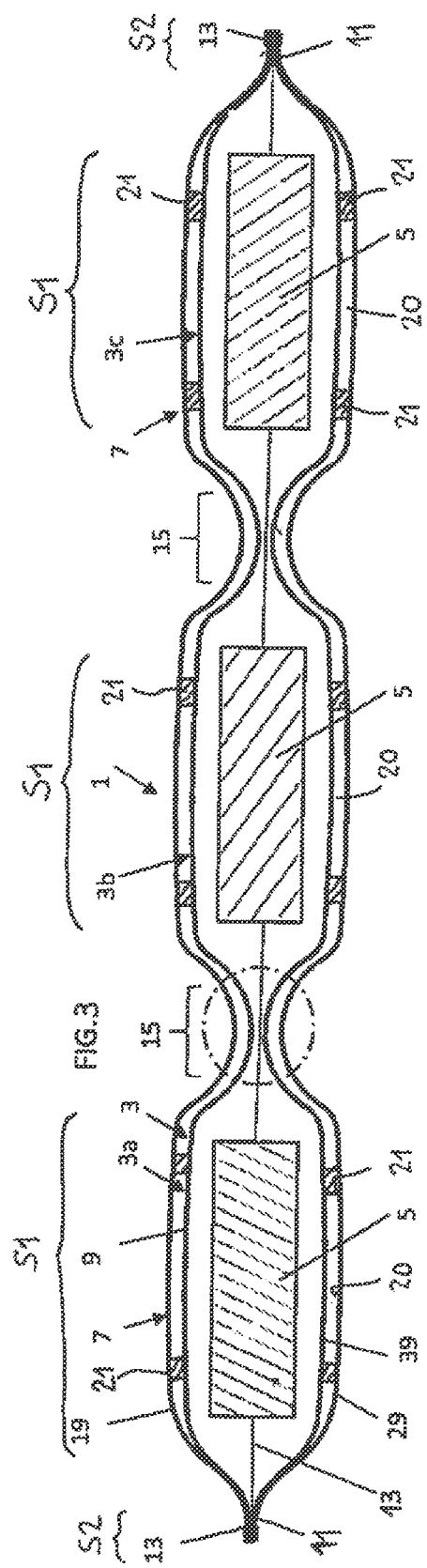
FIG.3
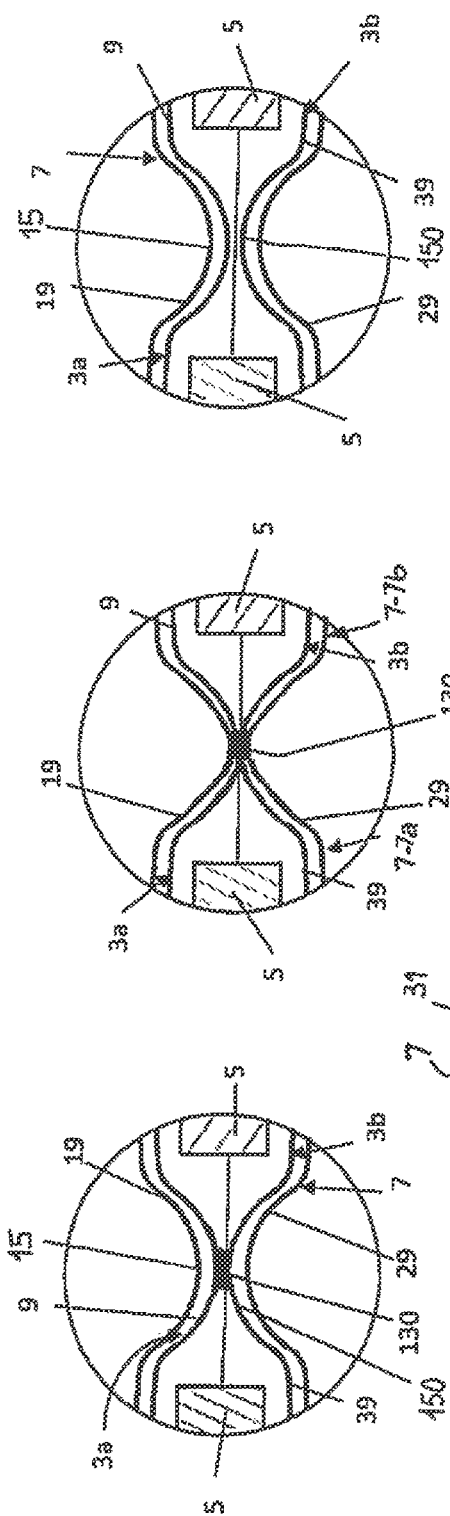
FIG.4
FIG.5
FIG.6
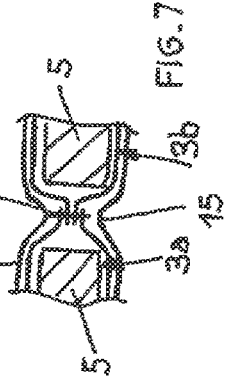
FIG.7

ASSEMBLY WITH ENHANCED INSULATION

CROSS-REFERENCE TO RELATED APPLICATIONS

This application is a 35 U.S.C. § 371 filing of International Application No. PCT/FR2018/052093 filed Aug. 22, 2018, which claims the benefit of priority to French Patent Application No. 1757791 filed Aug. 22, 2017, each of which is incorporated herein by reference in its entirety.

The present invention relates to the field of thermal management through thermally insulating elements, or even materials, the latent heat of which is used, such as MCP materials (phase change or transition material).

VIP panels (vacuum insulation panels; VIP) are thermally insulating materials with low thermal conductivity typically obtained by a vacuum, which can also be defined as a rarefaction of gases, such as air, or more generally a "controlled atmosphere".

"VIP" means a structure under controlled atmosphere containing at least one a priori porous thermally insulating material.

By "controlled atmosphere" this text refers both to a vacuum in a sealed enclosure and, in such an enclosure, to a gas (such as $CO_2$, or Argon) having a thermal conductivity lower than that of the ambient air (26 mW/m·K). The porosity of the thermally insulating material is then not imposed.

"Porous" means a material having interstices allowing the passage of air. Open-cell porous materials thus include foams but also fibrous materials (such as glass wool or rock wool).

"Deformable" is a structure that can be deformed, for example bent, by hand.

"Vacuum" outer sleeve indicates that this sleeve is either really under a vacuum (i.e. under gas, such as air, which is rarefied; therefore at a pressure lower than $10^5$ Pa), or contains, as a said "controlled" atmosphere, a gas having a thermal conductivity lower than that of the ambient air.

«Wall or sheet» will refer to one element which may typically be made in the form of a multilayer film comprising (PE and PET) only or aluminium-lined polymeric films in a, for example, laminated (sheet of thickness of around ten micrometres) or metallised (vacuum deposition of a film of a few tens of nanometres) form. Alternatively, this element can be like a deformable metal (e.g. aluminium) wall or sheet, shaped by stamping or bending, and from one to a few tenths of a mm thick.

This applies in particular to an assembly comprising:
at least one first pocket containing a thermally insulating material and wherein a first controlled atmosphere prevails, and
at least one second pocket which surrounds the first pocket and wherein a second controlled atmosphere prevails.

In order to obtain high-performance thermally insulating material, it is known, for example in a VIP, to use as thermally insulating material an aerogel (e.g. silicic acid) or at least one micro or nanoporous element in general, such as precipitated silica and fumed silica, constituting a porous "core" (or center) for the VIP.

Thus, a micro or nanoporous element of this kind is placed in the first above-mentioned pocket, while establishing a controlled atmosphere which can typically correspond to a (de)pressure ranging between less than $10^5$ Pa and more than $10^{-2}$ Pa.

However, over time the first and/or second pockets may leak and the vacuum may not persist at the initial pressure. Thermal conductivity will suffer, even though a microporous or even nanoporous thermally insulating material is an expensive and delicate product to implement and use.

EP 1647758 proposes, in this context, an assembly comprising:
at least one first pocket containing a heat-insulating material and wherein a first (said controlled) atmosphere prevails,
at least one second pocket:
which surrounds the first pocket,
which is peripherally closed at a minor peripheral surface, and
wherein a second (said controlled) atmosphere prevails, This can make it possible to dispense with the use of "high-end" thermally insulating material, such as an aerogel, without significantly altering thermal conductivity.

But the solution of EP 1647758 is hardly suitable:
for mass production, where, without compromising on the thermally insulating material quality of the assembly, many parts have to be moved and installed,
and for various situations where it must be possible to adapt the conformation of the assembly according to the parts or elements to be insulated or thermally managed.

In order to take the above into account, it is proposed in the invention that said assembly be such that:
it includes a plurality of said first pockets,
the or each thermally insulating material has open cells with a diameter greater than or equal to 1 micron,
the second pocket, which is unique, continuously extends around all the first pockets at respective major surfaces to the minor peripheral surface,
on at least substantially all of said respective minor and major surfaces, the respective second and first pockets are:
pressed against one another in pairs, or
applied by an empty space, which thus includes no material, and
between two successive first pockets that it joins, the second pocket forms an intermediate part where said pockets can be hinged with respect to one another.

It will be understood that, on a said pocket, the major surface occupies the major part of its extent (more than 50%), whereas the minor surface, which typically extends around the periphery of the major surface, occupies a reduced part (less than 50%) of the total extent of the pocket. If the pocket is welded to be closed, it is typically on the periphery, at the location of this minor surface, which forms a peripheral rim, that the welding will be carried out.

It will also be noted that the insulation material itself will be thermally less efficient than the best performing of these materials, but will potentially correspond to more common and more easily developed or commercially available insulation materials than, for example, aerogels.

And this lower performance in terms of clean thermal conductivity will have been compensated for
by the presence of the second controlled atmosphere, and
on therefore at least the essential part of said respective minor and major surfaces, by the absence of any material, this allowing the second pocket to play its full thermal and mechanical role in compliance with the requirements of possible mass production and displacement and installation in various situations.

This way, the following aims can be considered:
- cheaper and/or easier to industrialize assembly, especially mass-produced (for the automotive and/or aeronautics industries for example),
- an assembly having high insulation and/or thermal management performance(s), in particular in terms of overall thermal conductivity,
- a safely preserved first controlled (internal) atmosphere assumed, in particular because of the second atmosphere that (at least partially) surrounds it,
- a wider choice of thermally insulating material.

Although, as stated above, a gas (such as $CO_2$, or Argon) with low thermal conductivity can replace a vacuum, it is proposed that in the assembly:
- the first controlled atmosphere may be at a lower pressure than the second (external) controlled atmosphere, and/or
- the first controlled atmosphere is different from the second controlled atmosphere and corresponds to a vacuum less than or equal to 10 Pa.

Thus, by playing on the degree(s) of vacuum, it will be possible to refine the insulation and/or thermal management performances.

In addition, using vacuum makes it easier and cheaper to detect a loss of controlled atmosphere in the assembly.

Finally, the use of gases such as $CO_2$ or Argon can impose stricter implementation rules than a vacuum.

In this respect, it is also proposed that said first controlled atmosphere may correspond to a, preferably secondary, vacuum having a pressure less than or equal to $10^{-1}$ Pa.

Achieving such an industrially common vacuum, will make it possible to easily and cheaply achieve a high-performance insulation assembly with common thermally insulating materials.

In this respect, it is also proposed that the thermally insulating material may have open cells with a diameter greater than or equal to 10 microns.

The mechanical safety of the assembly has also been taken into account in connection with the targeted high insulation performance.

For this reason, it is also proposed that the second (external) pocket should include a metal wall that would confine the atmosphere.

This will be preferable to this metal wall being that of the or each first pocket(s). Indeed, at worst the pressures in the first and second pockets would balance each other out, if the first pockets became less tight over time, even though the metal wall would almost prevent any real risk of leakage from the second (external) pocket to the outside atmosphere.

A priori, the metal wall would be between 0.01 mm and 3 mm thick.

A problem can then be to obtain a wall that is both mechanically resistant and leakproof, having a relatively low thermal conductivity and that can be shaped to the probably non-planar shape desired, in an economically satisfactory and industrially simple manner to be implemented in mass-production for the automotive and/or aeronautical industries for example.

A compromise has been found, with a metal wall having a thickness ranging between 0.05 mm and less than 1 mm and selected from the group comprising stainless steel, titanium, aluminium and other metals, or metal alloys, having a thermal conductivity of less than 100 mW/m·K at 20° C. and in an atmospheric pressure environment.

The first pockets could include at least one polymeric film (whether alone or metal-lined) that will confine the atmosphere.

Thus, in a vacuum situation, in particular for these first (internal) pockets, their wall(s) can be defined (first) as a function of the more stringent sealing conditions to be achieved, the role of mechanical protector in particular being assigned more to said second (external) pocket, the materials of the first and second pockets then being different.

As regards the vacuum that can be provided in said second pocket, it is in any case proposed that, if a vacuum is provided, the second controlled atmosphere then corresponds to a primary vacuum having a pressure ranging between less than 10 Pa and more than $10^{-3}$ Pa.

Such a primary vacuum is easy and inexpensive to achieve industrially, even in large series.

As regards the realization of the first pockets, these may be provided in a sequence, independent of one another in this case thus not joined together in pairs by a said intermediate hinge part.

In this succession of first pockets, each one can then be closed by airtight sealing and/or the first pockets will be disjointed from each other.

In this way, watertightness can be ensured pocket by pocket, the pockets can be easily differentiated (in size and/or volume and/or constitution and/or relative disposition), or manufactured at one time and then put on the shelf for a subsequent provision.

Alternatively:
- said (or at least some of the) first (internal) pockets will form a single assembly, so that these first pockets are under a said first common atmosphere, and will therefore have a single airtight seal around the periphery of all these first pockets joined together in pairs by an intermediate hinge part, or
- said first pockets may be joined together in pairs by a weld, a mechanical bond (such as a clip), or a chemical bond (such as an adhesive).

The cohesion of the first pockets with each other will thus be achieved.

In addition, the intermediate hinge parts of two successive first pockets may then form by themselves during the evacuation, due to the internal presence of the successive elements of the thermally insulating material around or on either side of which these intermediate hinge parts will then be located, as a result of the suction caused by the evacuation.

It should also be noted that if, between two successive first pockets which it joins together, the or each intermediate part continuously extends from one of the first pockets to the first following pocket, this could further encourage mass production of the same given type of assembly.

In order to allow an application in confined spaces and/or with complex conformation (corners, recesses, bumps . . . ), to ensure a maximum heat exchange surface and to facilitate handling and mass production conditions, it is also proposed:
- that the second pocket comprises at least one polymeric film that confines the atmosphere,
- that the first pocket and the second pocket are defined by thermoformable polymeric films,
- and that in said first pockets:
  - the or each thermally insulating material defines a three-dimensional porous structure the shape of which will be followed by the polymeric film, the porous structure being interposed between two pairs of major surfaces (S1 below) of the polymeric films of the first pocket and the second pocket, respectively, and the polymeric films of the first pocket and of the second pocket are thermoformed at said respective major surfaces (S1), between which the porous structure, which is three-dimensional, will have a curved shape and/or reliefs and/or recesses.

In addition, the or each thermally insulating material can be compressed and thus be more thermally insulating and easier to integrate.

On the same subject, it is also proposed:
that the thermally insulating material(s) contained in the first pockets has/have a first density,
that there are second thermally insulating structures comprising the same thermally insulating material or a different thermally insulating material as above, having in any case a second density is interposed between the first pockets and the second pocket,
the second density is lower than the first density, and
that said thermally insulating materials contained in the first pockets are superimposed with said second thermally insulating structures.

"Porous" designates a thermally insulating material (or a structure) having interstices enabling the passage of air. Open-cell porous materials thus include foams but also fibrous materials (such as glass wool or rock wool). The passage interstices that can be described as pores have sizes smaller than 1 or 2 mm, preferably 10 microns.

Figure 9:
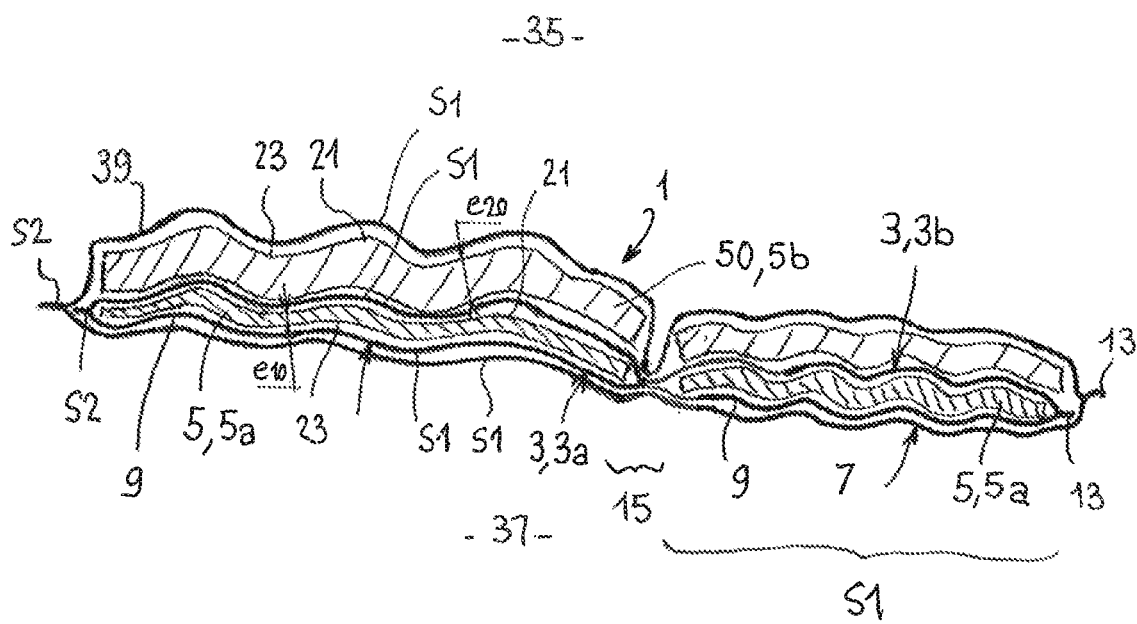

If need be, the characteristics of the solutions disclosed herein will be better understood, and other details and advantages thereof will appear upon reading the following description given by way of a non restrictive example while referring to the appended drawings wherein:

If need be, the characteristics of the solutions disclosed herein will be better understood, and other details and advantages thereof will appear upon reading the following description given by way of a non restrictive example while referring to the appended drawings wherein:

FIGS. 1 and 3-7 are schematic sections, each corresponding, in one embodiment, to the section line I-I of FIG. 2, with multiple interior pockets following one another in a direction of elongation of the assembly forming a strip, FIG. 2 is an external perspective diagram of the shape that the assembly may take according to any one of the other figures (Zone II FIG. 1, which can be found in variants of FIGS. 4 to 7), each of FIGS. 4 to 7 shows a schematic illustration of a possible enlarged version of the area of the connection (intermediate parts 15; 150 below) identified by a dotted line in FIG. 3, according to respective embodiments, and FIGS. 8,9 are schematic sections, like the above-cited sections, of two embodiments with double pockets, but with thermorformed walls and 3D thermally insulating materials.

From the figures, it can be seen that the invention applies to an assembly 1 comprising:
a plurality of first pockets 3 (3a,3b,3b in the figures) individually containing thermally insulating material 5, and
at least a second pocket 7 that surrounds all the first pockets 3.

A first controlled atmosphere prevails in each first pocket 3 and a second controlled atmosphere, different from the first, prevails in the second pocket 7.

The second pocket is single from the outset or is so after several such pockets (such as 7-7a, 7-7b FIG. 5) have been butt-welded together in zones 15; see below. Therefore, only a second single pocket is mentioned below, since this is what will appear on the finished part 1.

The second pocket continuously extends around the first pockets 3;3a,3b,3c at the respective major surfaces S1, and surrounds all the first pockets up to the minor peripheral surface S2 where the second pocket is peripherally closed: zone 13, rim 11.

On at least most of the respective minor surface S2 and major surfaces S1, the respective first and second pockets are:
pressed against one another in pairs (by the vacuum created as in the example in FIGS. 1,2 for the surfaces S1, and the peripheral seal, for the surface S2); or
separated by an empty space 20 (FIG. 3 at the location of the major surfaces S1) which thus includes no material.

It will be understood that these respective major surfaces S1 (and thus the minor surfaces S2 which complete them respectively) concern both the first and the second pockets, since the second pocket continuously surrounds the first one.

The empty space 20 may, for example, have been obtained by spacers 21, such as paving stones, interposed between the walls 19,29 and which, being very local, therefore occupy only a very minor area of the major surfaces S1; see FIG. 3.

It will be understood that each major surface S1 extends opposite the corresponding material 5 and thus the swollen part of the pockets. The minor area S2, of course smaller in size, extends ta the location of the peripheral seal 13. It could also be considered that the intermediate parts 15 and/or 150 (see below) form other minor surfaces S2', with S2+ΣS2'<ΣS1 (Σ=sum of).

Together, the first and second pockets form an assembly defining a panel with two opposite sides.

To make the first or second pockets, instead of two half-walls, a single wall folded on itself at one end and which surrounds and isolates the pocket(s) concerned can be provided. These walls are all at least airtightly sealed all around the periphery 11.

It could also be provided that the, respectively inner and outer pockets 3,7, are formed of a single, flexible or deformable, wall or sheet folded three times on itself at the ends of the assembly 1, so as to form the first pockets 3 surrounded by the second pocket 7.

According to the invention:
the first controlled atmosphere is different from the second controlled atmosphere, and
the thermally insulating material 5 preferably has open cells with a diameter greater than or equal to 1 micron.

Indeed, the thermally insulating material 5 does not need to have very small pore sizes (micro or even nanopores), whereas this is required when a lower vacuum is conventionally applied in the pocket wherein it is directly confined.

The solutions presented here make it possible to compensate, with almost identical thermal insulation coefficients, a lower porosity to the containment gas (vacuum in particular) of the thermally insulating material 5 by a lower controlled first atmosphere (higher vacuum) than in known cases, with the additional presence of said second external pocket 7.

The first controlled atmosphere present in the first pockets 3;3a,3b3c is here at a lower pressure than the second controlled atmosphere present in the second pocket 7.

Thus, it is preferable to provide for a recess in each first pocket 3 containing a thermally insulating material 5. On the other hand, the hypothesis of at least a second controlled atmosphere defined by (at least) a gas with a thermal conductivity lower than that of the ambient air will always remain possible, even if a negative pressure (less than that in the first pockets 3) will be preferred in the second pocket 7.

All the more so with an open-cell thermally insulating material 5 with a large diameter, notably greater than 1 micron, for example greater than 10 or even 100 microns, an efficient result in terms of preserving a low thermal conductivity (which could then be less than or equal to 40 W/m·K at atmospheric pressure) could be maintained with a first controlled atmosphere corresponding to a vacuum having a pressure less than or equal to $10^{-1}$ Pa, therefore (almost) as with a lower vacuum and a thermally insulating material 5 which would be nanoporous (therefore with cells of much smaller diameter).

It is then proposed that the thermally insulating material 5 should have open cells with a diameter greater than or equal to 10 microns. The thermal insulating material 5 can then be made of polyurethane (PU) or polystyrene (PS) foam, for example, or a fibrous material (such as glass or rock wool).

As a reminder, it is recalled that an open-cell or open-honeycomb thermally insulating material may be a thermally insulating material that does not settle, does not absorb water, and is permeable to water vapour.

In a closed cell or honeycomb solution, a spray insulating material solution, air barrier protection, resistant to moisture penetration, with lower water vapour permeability is preferred.

With open cells or honeycombs, a breathable, lighter and more flexible material with a high vapour permeability is obtained.

The first atmosphere will be even more favourably a vacuum less than or equal to $10^{-2}$ or even $10^{-3}$ Pa, thus a secondary vacuum.

Among the possibilities for making the wall(s) of the second pocket 7, such as the walls 19,29, in FIG. 1 or 3, it is worth noting in particular that of a metallic construction which will therefore confine the atmosphere.

One embodiment in the form of two metal sheets, or two portions of the same metal sheet (sheet or wall folded as mentioned), reserving a space between them is proposed. The or each metal sheet can specifically have a thickness of less than 1 mm and be selected from the group comprising stainless steel, titanium, aluminium and other metals or metal alloys with a thermal conductivity of less than 100 mW/m·K, at 20° C. and in an atmospheric pressure environment.

With a metal wall thickness ranging between 0.01 mm and 3 mm, ease of implementation and conformation if necessary non-planar, mechanical strength and performance in terms of thermal conductivity are combined A.

Alternatively, second pocket walls 7 consisting of polymeric films (therefore thinner than sheets) lined with aluminium in a laminated (overall film about ten micrometres thick) or metallised form (for example by vacuum deposition of a film of a few tens of nanometres), can be envisaged.

However, it may be preferable to reserve this walled solution, such as the two marked 9,39 in FIG. 1, of containment based on polymeric film(s) for the first pockets 3 which are not directly exposed to the stresses and aggressions (such as friction) of the external environment.

In the context of the invention, it will be possible, still with comparable performances in terms of low thermal conductivity), to provide for the second atmosphere to correspond to a vacuum, but only a primary one, with even preferably a pressure between less than $10^5$ Pa and more than $10^{-2}$ Pa, or even probably $10^{-1}$ Pa.

To confine the atmosphere in the first and second pockets 3, the seal 13 on the periphery 11 will be tight.

Furthermore, as shown in the figures, two successive first pockets are joined by an intermediate part where said pockets can be hinged together. This intermediate part is formed on the second pocket 7 (zone 15) and can also be formed between two successive first pockets (hinge zone 150).

A pocket being, or comprising, a zone surrounding a thermally insulating material 5 and wherein a controlled atmosphere prevails, therefore, in each assembly 1, and in particular those illustrated:

several successive first pockets 3; 3a,3b,3c thus each containing a thermally insulating material 5, and at least a second pocket 7, or 7-7a and 7-7b in FIG. 5 showing two successive pockets 7a,7b joined into one by a seal 130 in the intermediate part 15 are present.

A detail of the intermediate parts 15,150 of the assembly 1 in FIG. 3 is shown in four possible embodiments of FIGS. 4-7, the illustration of the marked area of FIG. 3 being shown in FIG. 6.

A common aspect is that in the embodiments of FIGS. 3-6, both the first pockets 3a,3b,3c and the second pocket 7 (or 7a,7b,7c together) are formed by at least one wall or sheet which forms both the pockets and the intermediate parts 15,150 of both the first pockets (parts 150) and the second pocket (parts 15).

In a different way, in the embodiment of FIG. 1, the first pockets 3a,3b,3c are thus individualized, or disjointed. Only the second pocket 7 is formed by at least one such wall or sheet which forms both the parts (each with surfaces S1) which surround the first pockets 3a, 3b, 3c and their materials 5 and the intermediate parts 15 of this second pocket.

Each first pocket has a peripheral seal 13 (or 130 FIGS. 4,5). There is a first atmosphere per pocket 3a,3b,3c and at least a second controlled atmosphere for all the second pockets, with in this embodiment, a single, peripheral seal 13.

In other words, there is no zone seal 15 between two adjacent or successive major surfaces S1 of the second pocket. In the embodiments of FIGS. 4 and 6, it is the same thing. However, in the embodiment of FIG. 4, there is a seal 130 between two first adjacent or successive pockets, here 3a,3b.

In the embodiment of FIG. 6, there is no intermediate seal between the first two pockets. Thus, as shown in FIG. 3, there is only one single peripheral seal 13 common to the assembly formed by the first pockets and the second pocket.

In the embodiment of FIG. 5, a seal 130 can be found between both two first pockets, here 3a,3b, and two, adjacent or successive parts, here 7a,7b, of the second pocket. Each seal 130, thus located in the intermediate parts 15,150 can be common to the first and second pockets. If there were originally several second pockets, the seals 130 merged them together into a single second pocket 7.

As regards (of course tight) seals 13, 130, they may consist of one or more welding line(s), or even a chemical seal (typically glue).

In practice, welding is preferred to brazing, at least for the sealing of the first pockets 3;3a,3b,3c, and thus the establishment and maintenance over time of the higher secondary vacuum (if provided), the term "Welding" then excluding brazing, in accordance with the accepted technical meaning. In the welding provided herein, no filler material is used and/or the assembled edges are not fused. Each weld will be continuous at least for the sealing of the first pockets (it will not be a spot weld). Indeed, it turned out that spot brazing, at least to establish the higher secondary vacuum, was not suitable, in particular because of the combination of the two atmospheres.

In the embodiment of FIG. 7, the first pockets, here 3a,3b, are joined together in pairs by a mechanical bond 31. These can be clips or links such as double-sided adhesives that could provide a mechanical bond but also a possible tight seal between the first pockets. Between two successive first pockets which it joins together, the second pocket 7 always forms intermediate parts 15, where said pockets can be hinged together.

The advantage in terms of speed of assembly, standardisation of the manufacturing process and flexibility can be noted if, between two successive first pockets 3 which it joins together, the or each intermediate part 15 of the second pocket 7 continuously extends from one of the first pockets, such as 3a, to the next first pocket, such as 3b, especially since the same may be true for the intermediate parts 150 which hinge the first pockets together see, for example, FIGS. 1,3.

FIGS. 8,9 also show two solutions for, as already mentioned, ensuring installation in cramped areas and/or areas of complex conformation (corners, recesses, bumps . . . ), maximising the heat exchange surfaces.

Of course, there is the "soft" intermediate part 15 that the second pocket 7;7a,7b forms between two successive first pockets that it joins together.

But above all, it proposes a said assembly 1, in which:
the second pocket 7;7a,7b, is made, like the first pockets 3;3a,3b, of at least one polymeric film 39 which "continuously" extends, as already mentioned, and which confines the atmosphere,
and said polymeric films (i.e. polymer alone or metal-lined) 9.39 of these pockets are thermoformable.

Also, in the first pockets:
the or each thermally insulating material 5 defines a three-dimensional porous structure the shape of which is followed by the polymeric film (9,39), the porous structure (5) being interposed between two pairs of major surfaces (S1) of the polymeric films 9,19 of the first pocket and of the second pocket, respectively, and
these respective polymeric films 9,19 are thermoformed at said two respective major surfaces (S1), between which each porous structure 5, which is three-dimensional, thus has, as before, a curved shape 22 and/or reliefs 21 and/or recesses 23.

It will be understood that the expression "three-dimensional" (3D) is equivalent, as in the common sense, to not (entirely) planar. In English, the recesses and reliefs (or bumps) of the porous structures 5 (and more generally of the assembly 1, since thermoformed around these structures, the respective polymeric films 9,19 follow their contours) can also be translated by "embossings".

The porous structures 5 can advantageously be powder-based or fibrous textile structures and thus include polymer, mineral (e.g. glass, basalt) or natural fibres (e.g. cellulose, flax, hemp). A felt will be interesting for its intrinsic compression (felt is a compressed, non-woven structure obtained by pressing and bundling fibres). On the other hand, the use of foam that can lose its thermally insulating material quality after a certain degree of compression will be avoided.

The respective 3D shaping of the assemblies 1 of the solutions in FIGS. 8,9 can be advantageously carried out in shaping moulds, after closure of all pockets 3,7 and realisation of said first and second controlled atmospheres. In the moulds, the porous structures 5 can advantageously be compressed.

Another performance aspect has been schematized in FIG. 9. It is a solution where both thermal and acoustic problems will be dealt with in a refined way.

More precisely, it is proposed first to use the above-mentioned assembly with intermediate parts 15 and thus with the porous structures 5 in their sleeves 3 formed by the barrier wall 9. This wall is always thermoformed at the location of said two major surfaces S1 between which each porous structure 5, which is three-dimensional, therefore has a curved shape and/or reliefs and/or recesses, as schematically shown.

However, this solution also provides for
that the porous structures 5 define first porous structures comprising a porous material 5a having a first density,
that in addition there are one or more second porous structure(s) 50 comprising the same porous material (5a), or a different porous material 5b, having a second density.

The second density is lower than the first density, and on either side of the part marked 15 in FIG. 9, the first and second porous structure(s) 5,50 are superimposed.

Superimposed here has the meaning that a double thickness: is obtained the cumulative thickness of the porous structures 5.50 between the zones 35 and 37 which extend on either side of the assembly 1, in the direction of its thickness. The superimposition is not necessarily in a horizontal plane; it may be in a vertical plane, as for example in a car door wherein the assembly 1 would then be erected vertically. It should be noted in this respect that applications other than on a vehicle are possible; in the building industry for example.

With this in mind, we will note again:
that each second porous structure 50 has a curved shape and/or reliefs 21 and/or recesses 23, and
that the first pockets 3;3a,3b and the second porous structure 50 are therefore:
enclosed together in the second pocket 7 with a wall 39,
and interposed between two major surfaces S1 of said wall 39, said wall 39 being thermoformed at the location of said two major surfaces S1.

It should be understood that these two major surfaces are here the image on the sleeve 7 and its wall 39 of the two major surfaces S1 on the sleeve 37 and its wall 9. The minor/marginal peripheral zone in terms of surface area, here S2, remains.

The second sleeve 7 is not necessarily under a vacuum. Each second porous structure 50 could be housed in a third vacuum sleeve.

Typically less compressed than the first porous structure 5, the second porous structure 50 will have a thickness e20 greater than the thickness e10 of the first porous structure 5, which it doubles in thickness, this having to be considered everywhere or over at least most of the largest of the surfaces of the porous structures 5,50.

The thickness e20 can range from 3 to 15 mm. The thickness e10 can range from 0.5 to 2.5 mm. The first density can range from more than 300 to 800 kg/m$^3$; the second density can range from 100 to less than 300 kg/m$^3$.

Each first porous structure 5 provides relevant thermal and acoustic insulation. Every second porous structure 50 provides reinforced thermally insulating material and more limited acoustic insulation. The result is a hybrid solution with a heavy (mass-effect) assembly that absorbs in the low frequencies (20 to 200 Hz).

The invention claimed is:

1. An assembly comprising:
   a plurality of first pockets individually containing at least one thermally insulating material and in which a first atmosphere prevails, the at least one thermally insulating material having open cells with a diameter greater than or equal to 1 micron,
   at least one second pocket:
      which encloses the plurality of first pockets,
      in which a second atmosphere prevails, and
      which includes intermediate parts each interposed between two successive of said plurality of first pockets that each intermediate part joins together,
   characterized in that:
   the intermediate parts are adapted to allow said plurality of first pockets to be hinged with respect to one another,
   the second pocket, of which there is only one, and which is peripherally closed at a location of a minor peripheral surface, continuously extends around all the plurality of first pockets at locations of respective major surfaces, up to the minor peripheral surface,
   on at least a main part of said respective minor and major surfaces, the respective second pocket and plurality of first pockets are:
      applied against one another in pairs, or
      separated by an empty space, which thus includes no material.

2. An assembly according to claim 1, wherein the first atmosphere is different from the second atmosphere.

3. An assembly according to claim 1, wherein the first atmosphere is at a lower pressure than the second atmosphere.

4. An assembly according to claim 3, wherein:
   the first atmosphere is a vacuum having a pressure less than or equal to $10^{-1}$ Pa.

5. An assembly according to claim 1, wherein the at least one thermally insulating material has open cells with a diameter greater than or equal to 10 microns.

6. An assembly according to claim 1, wherein each first pocket of the plurality of first pockets comprise at least one polymeric film which confines the atmosphere.

7. An assembly according to claim 6, wherein at least some of first pockets of the plurality of first pockets form a single assembly, so that said plurality of first pockets are commonly under said first atmosphere and for this purpose have a single airtight seal at the periphery of all said plurality of first pockets joined together in pairs by said intermediate parts.

8. An assembly according to claim 6, wherein:
   the second pocket comprises at least one polymeric film which confines the second atmosphere,
   the polymeric films of the plurality of said first pockets and the second pocket are thermoformable, and
   in each first pocket of said plurality of first pockets:
      the at least one thermally insulating material defines a three-dimensional porous structure having a shape which is followed by the at least one polymeric film, the three-dimensional porous structure being interposed between two pairs of major surfaces of the polymeric films of the first pockets and the second pocket, respectively, and
      the polymeric films of the plurality of said first pockets and of the second pocket are thermoformed at said two respective major surfaces, between which the three-dimensional porous structure has at least one of a curved shape, reliefs and recesses.

9. An assembly according to claim 8, wherein the at least one thermally insulating material is compressed.

10. An assembly according to claim 1, wherein at least some of first pockets of the plurality of first pockets form a single assembly, so that said plurality of first pockets are commonly under said first atmosphere and for this purpose have a single airtight seal at the periphery of all said plurality of first pockets joined together in pairs by said intermediate parts.

11. An assembly according to claim 1, wherein the first pockets of said plurality of first pockets are separated from each other.

12. An assembly according to claim 1, wherein, between two successive first pockets of said plurality of first pockets, each intermediate part of the second pocket continuously extends from one first pocket of the plurality of first pockets to the next first pocket of said plurality of first pockets.

13. An assembly according to claim 1, wherein the second pocket comprises a metal wall which confines the second atmosphere.

14. An assembly comprising:
   a plurality of first pockets in which a first atmosphere prevails, each of the plurality of first pockets containing a first thermally insulating material,
   a second pocket:
      encloses the plurality of first pockets,
      in which a second atmosphere prevails, and
      which includes intermediate parts, individually interposed between two successive first pockets of said plurality of first pockets that the intermediate part joins together,
   wherein:
   the intermediate parts are adapted to allow said successive first pockets to be hinged with respect to one another,
   the thermally insulating materials have individually a first density,
   between at least some of the first pockets of the plurality of first pockets and the second pocket are interposed second thermally insulating structures, each comprising a second thermally insulating material which is one of a thermally insulating material chemically identical to the first thermally insulating material and a thermally insulating material chemically different from the first thermally insulating material, at least some of the thermally insulating materials of the second thermally insulating structures having a second density lower than the first density, and
   the respective first thermally insulating materials are respectively superimposed with the respective second thermally insulating structures.

15. The assembly according to claim 14, wherein at least one of the first atmosphere and the second atmosphere is under vacuum.

16. The assembly according to claim 14, wherein the second pocket is peripherally closed and continuously extends around all the first pockets of said plurality of first pockets.

17. The assembly according to claim 16, wherein the first atmosphere and the second atmosphere are under vacuum.

18. The assembly according to claim 17, wherein the second atmosphere is at a vacuum pressure between less than $10^5$ Pa and more than $10^{-3}$ Pa.

19. The assembly according to claim 14, wherein the first atmosphere is at a first pressure, the second atmosphere is at a second pressure, and the first pressure is different from the second pressure.

20. The assembly according to claim 19, wherein the second atmosphere is at a vacuum pressure between less than $10^5$ Pa and more than $10^{-3}$ Pa, and the first atmosphere is at a vacuum pressure less than or equal to 10 Pa.

* * * * *